United States Patent
Fernandez

(10) Patent No.: US 6,616,962 B1
(45) Date of Patent: Sep. 9, 2003

(54) CAPSICUM SEED SUPPLEMENT

(76) Inventor: Alex Frank Fernandez, P.O. Box 404, Annapolis, MD (US) 21404

(*) Notice: Subject to any disclaimer, the term of this patent is extended or adjusted under 35 U.S.C. 154(b) by 0 days.

(21) Appl. No.: 08/742,419

(22) Filed: Oct. 9, 1996

Related U.S. Application Data

(63) Continuation of application No. 08/324,216, filed on Oct. 17, 1994, now abandoned.

(51) Int. Cl.[7] ............................................... A23K 1/00
(52) U.S. Cl. ............................................ 426/635
(58) Field of Search .......................... 426/635, 805; 424/410, 405, 406

(56) References Cited

U.S. PATENT DOCUMENTS

| | | | |
|---|---|---|---|
| 826,990 A | 7/1906 | Cartwright | |
| 4,128,640 A | 12/1978 | Klein | 424/195 |
| 4,197,293 A | 4/1980 | Klein | 424/195 |
| 4,197,294 A | 4/1980 | Klein | 424/195 |
| 4,455,304 A | * 6/1984 | Yaralian | 424/195 |
| 5,672,354 A | 9/1997 | Blumberg | |
| 5,821,269 A | 10/1998 | Blumberg | |

OTHER PUBLICATIONS

Duun CRIS/USDA, Abstract 09167911, (1994).*
*Better Nutrition for Today's Living,* Herbs, "Cayenne, A Spicy Remedy" Rob McCaleb, Oct. 1993, pp 52–59.
EPA Database Oct. 26, 1993 pp 1–7, subject: "Capsaicin or Capsaicine".
*Journal of Arthritis Research,* Sep. 1994, p. 17.
Food and Drug Administration, HHS 21 CFR Ch. 1(Apr. 1, 1993 Edition), Para. 582.10, p. 533.
*Arthritis Pain and Topical Creams,* The Facts, Genderm Corp., 1992, 3 pgs.
*The Whole Chile Pepper Book,* pp 72–73 and pp 235–252.
*1991 PHS Technology Transfer Directory,* Office of Technology Transfer, National Institutes of Health, Bethesda, MD., Nov. 1991, p. 318.
*Wilson Bulletin,* 104(3), Donald Norman, Dept. of Biology, Univ. of Pennsylvania, J. Russell Mason and Larry Clark, USDA/APHIS/S&T, Denver Wildlife Research Center & Dept. of Biology, Univ. of PA., Jan. 27, 1992.
*Medline Data Base,* Abstracts, pp 1–19.
*Treatment of Candidiasis Fungus in Birds,* Infections and Parasitic Diseases of Wild Birds, Iowa State Univ. Press, Ames, Iowa 1971, Chapter 17, 1 pg.

*Carotenoids as Colorants and Vitamin A Precursors,* Alan H. Brush, pp. 141, 541–545.
*Amer, Journal of Medicine,* Impairment of Immune System, Olson, p. 836, Sep. 26, 1994.
*Importance of Vitamin A in Humans & Animals—Epithelial Tissue,* Vitamin A in Epithelial Differentiation and Skin Carcinogenesis, Luigi M. De. Luca, Ph.D, Nadine Darwiche, Ph.D, Giulia Celli, B.S., Karolina Kosa, Ph.D, Carol Jones, M.S., Sharon Ross, Ph.D., and Li–Chuan CHen Ph.D., Nutrituion Reviews Vol 52, No. 2, Feb., 1994 pp. S45 and S64.
*Diseases of Cage and Aviary Birds,* Margaret L. Petrak, Nutrition, C. Ivar Tollefson, Lea & Sebeger, Phili. 1969, pp. 143–146, 149, 245, 317, 352, and 496.
Declaration patent expert, Jere Sears, Esquire submitted in *Snyder Seed Corporation v. Scrypton Systems, Inc.,* Civil Action No. 98 CV .0087.
Request for Reexamination for U.S. patent No. 5,821,269.
Request for Reexamination of U.S. patent No. 5,672,354.
Declaration of Dr. Joseph Dunn's.
Decision of the Board of Patent Appeals and Interferences in U.S. patent application Ser. No. 07/892,484.
Declaration of Dr. Carl E. Motsenbocker's.
*Encyclopedia of Food and Color Additives,* George A. Burdock, Ph.D., P453–455 (1997).
*Red Hot Peppers,* Jean Andrews, p. 40 (1993).
*Food Taste Chemistry,* James C. Boudreau, p. 61 (1979).
Appeal Brief filed in U.S. patent application Ser. No. 07/892, 484.
Copy of Court Decision in *Synder Seed Corporation v. Scrypton Systems, Inc.* Civil Action No. 98 CV .0087 presently pending in the United States District Court for the Western District of New York.
Snyder Seed Corporation's Reply filed in *Snyder Seed Corporation v. Scrypton Systems, Inc.* Civil Action No. 98 CV .0087.
Scrypton System, Inc.'s Amended Answer filed in *Snyder Seed Corporation v. Scrypton System, Inc.* Civil Action No., 98 CV .0087.

* cited by examiner

Primary Examiner—Carolyn Paden
(74) *Attorney, Agent, or Firm*—Foley & Lardner

(57) ABSTRACT

A method for enhancing the nutritional value and the vitamin A content of bird food while simultaneously rendering the bird food undesirable to predators comprising a capsicum botanical.

1 Claim, No Drawings

CAPSICUM SEED SUPPLEMENT

This application is a continuation of application Ser. No. 08/324,216, filed Oct. 17, 1994 now abandoned.

BACKGROUND OF THE INVENTION

The use of capsaicin analogs has been known as a rodenticide and some of these formulations have been used for rodent control. None, however, have incorporated the unique nature of the capsicum botanical to provide improved nutrition for birds while protecting wild bird food from raiding mammals.

SUMMARY OF THE INVENTION

This invention is a supplement added to wild bird seed which provides avian species essential vitamins, proteins and lipids. Through the addition of amounts of capsicum botanicals with high capsaicin content, the food value of prepared wild bird seed can be improved, while providing protection from consumption by mammals and insects.

This invention is an improvement over chemical solutions for mammal control in that the inherent nature of the capsicum plant provides a good source of vitamin A (beta carotene) for wild bird species.

DETAILED DESCRIPTION OF A PREFERRED EMBODIMENT

The present invention comprises a method for delivering vitamins, proteins and lipids to birds, while at the same time, protecting the wild bird food from raiding mammals. The present invention further encompasses a wild bird seed which is used in conjunction with the above method.

According to the present method, a capsicum botanical having a high capsaicin content is added to bird seed. By botanical, it is meant that the capsicum is derived from a plant, as opposed to a synthetic source. The botanical name of capsicum is *Capsicum frutescens L.* or *Capsicum annuum L.* The capsicum botanical contains complex sugars not found in synthetic capsaicin and thus, has been found to be recognizable and desirable by avian species. The capsicum botanical provides a pungent odor readily recognizable and repugnant to mammals and insects while at the same time being transparent to avian species. The capsicum botanical preferably possesses between 125,000 to 300,000 scoville heat units. Scoville Heat Units are a measure of pungency of spices, well known to those in the spice trade, and are determined by a procedure set forth in a publication of the American Spice Trade Association, *Official Analytical Methods*, (1968) 2nd Edition, Method 21.0.

The capsicum botanical having a high capsaicin content is added to wild bird seed and thereby improves wild bird nutritional intake by providing wild birds with a constant intake of vitamins, proteins and lipids, while at the same time, protecting the wild bird seed from mammals by causing discomfort to the nasal passages and mucous membranes of the raiding mammal. The capsicum botanical is readily eaten by wild birds but is distasteful to all mammals and causes them to modify their behavior in a way that will relocate them away from wild bird feeding areas.

In a preferred embodiment, the capsicum is ground to an ultra-fine state prior to being added to the wild bird seed. When the ultra-fine powder becomes airborne due to agitation of the feed, the airborne powder will contact the eyes and mucous membranes of the mammal causing irritation.

The capsicum botanical may be added to wild bird seed as a supplement, added to suet and any other stationary object that wild birds normally eat, or alternately, the capsicum botanical may be placed directly on exposed areas so as to cause mammals to modify learned responses and allow for natural relocation of the mammals away from the feeding areas of the birds. The capsicum botanical may be mixed with oil and water and then sprayed on seeds and/or any other botanical species on which birds feed. In addition, the capsicum may be added to solutions of sucrose and dextrose that are commonly used to feed, bird species. It is anticipated that the treated food may be used universally in any type of bird feeder.

By adding the capsicum botanical to the birds' food supply, the nutritional benefits to feeding birds is enhanced while at the same time, discouraging consumption of the treated food by mammals and/or insects. Thus, the addition of a capsicum botanical having a high capsaicin content improves the nutrient content of the seed and overall feed consumption of wild bird species.

I claim:

1. A bird food comprising an ultrafine capsicum plant having a scoville heat content of 125,000 to 300,000, said bird food comprising vitamins, proteins, lipids and complex sugars recognizable and desirable by avian species, with the proviso that said capsicum plant has not been added to said food as a chemical solution.

\* \* \* \* \*